US009065928B2

(12) United States Patent
Huang et al.

(10) Patent No.: US 9,065,928 B2
(45) Date of Patent: Jun. 23, 2015

(54) SPACE AND TIME BASED DEVICE CUSTOMIZATION

(75) Inventors: Ronald Keryuan Huang, Milpitas, CA (US); Robert Mayor, Half Moon Bay, CA (US); Isabel Ge Mahe, Los Altos, CA (US); Patrick Piemonte, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 152 days.

(21) Appl. No.: 12/472,062

(22) Filed: May 26, 2009

(65) Prior Publication Data

US 2010/0304730 A1 Dec. 2, 2010

(51) Int. Cl.
*H04W 4/02* (2009.01)
*H04M 1/725* (2006.01)

(52) U.S. Cl.
CPC ................................. *H04M 1/72572* (2013.01)

(58) Field of Classification Search
CPC .................................................. H04M 1/72572
USPC .............. 455/418–419, 424–425, 456.1–457, 455/432.3
See application file for complete search history.

(56) References Cited

U.S. PATENT DOCUMENTS

| 7,317,927 | B2 * | 1/2008 | Staton et al. ................ 455/456.4 |
| 8,095,146 | B2 * | 1/2012 | Raghavachari ............. 455/456.1 |
| 2005/0071476 | A1 * | 3/2005 | Tejaswini et al. ............. 709/227 |
| 2005/0130653 | A1 * | 6/2005 | Bisdikian et al. ........... 455/432.3 |
| 2006/0156209 | A1 | 7/2006 | Matsuura et al. |
| 2009/0011773 | A1 * | 1/2009 | Balachandran et al. ... 455/456.1 |
| 2011/0044310 | A1 * | 2/2011 | Uhlik ............................. 370/338 |
| 2011/0235624 | A1 * | 9/2011 | Scott et al. .................... 370/338 |

FOREIGN PATENT DOCUMENTS

| CN | 1832494 A | 9/2006 | |
| CN | 101026513 | 8/2007 | |
| EP | 1841256 A1 * | 10/2007 | ............... H04Q 7/38 |
| JP | 2001119753 A | 4/2001 | |
| JP | 2004357181 A | 12/2004 | |
| JP | 2006197190 A | 7/2006 | |
| JP | 2007116244 A | 5/2007 | |
| JP | 2008066781 A | 3/2008 | |
| JP | 2009027355 A | 2/2009 | |

OTHER PUBLICATIONS

International Search Report and Written Opinion of the International Searching Authority, PCT Application Serial No. PCT/US2010/035481, Jan. 17, 2011, 12 pp.
Communication Relating to the Results of the Partial International Search, Oct. 21, 2010, International Application No. PCT/US2010/035481, 6 pp.

(Continued)

*Primary Examiner* — Babar Sarwar
(74) *Attorney, Agent, or Firm* — Fish & Richardson P.C.

(57) ABSTRACT

Customizing a device based on space and time (e.g., a geographic position of the device at a particular time) is disclosed. In one aspect, geographic position data of a device is obtained. Temporal data that is related to the geographic position data is obtained. An operational mode is selected based on the geographic position data and the temporal data for activation on the device. In some implementations, the operational mode identifies a communication medium.

18 Claims, 10 Drawing Sheets

(56) References Cited

OTHER PUBLICATIONS

Japan Final Notification of Reasons for Refusal for Application No. 2012-513133 dated May 22, 2013, 6 pages.
KIPO's Notice of Preliminary Rejection (English Translation) for Application No. 10-2011-7029661 dated Jul. 11, 2013, 13 pages.
Chinese Patent Office Action for Application No. 201080023247.5 dated Apr. 25, 2013, 1 page.
Chinese Patent Office Action for Application No. 201080023247.5 dated Jul. 23, 2013, 13 pages.
Japan Notification of Reason(s) for Refusal for Application No. 2012-513133 dated Jan. 31, 2013, 3 pages.
Chinese Patent Office Action for Application No. 201080023247.5, dated Mar. 13, 2014, 17 pages (With translation).
Chinese Patent Office Action for Application No. 201080023247.5 dated Jul. 14, 2014, 11 pages (with translations).

* cited by examiner

SPACE AND TIME BASED DEVICE CUSTOMIZATION

TECHNICAL FIELD

This subject matter is generally related to location-based services for electronic devices.

BACKGROUND

Conventional mobile devices are often dedicated to performing a specific application. For example, a mobile phone provides telephony services, a personal digital assistant (PDA) provides a way to organize addresses, contacts and notes, a media player plays content, email devices provide email communication, a browser allows a user to surf the Internet, etc. Modern mobile devices can include two or more of these applications.

Some mobile devices (e.g., an iPhone®) can use positioning technology to determine the mobile device's geographic position, which can include the mobile device's geographic location and heading or direction. The geographic position of the mobile device can be used to determine, for example, how the mobile device operates or services or data that may be available to the mobile device at the geographic position.

SUMMARY

Customizing a device based on space and time (e.g., a geographic position of the device at a particular time) is disclosed. In one aspect, geographic position data of a device is obtained. Temporal data that is related to the geographic position data is obtained. An operational mode is selected based on the geographic position data and the temporal data for activation on the device. In some implementations, the operational mode identifies a communication medium. Other implementations are disclosed which are directed to systems, methods, and apparatus including computer-readable mediums.

Particular embodiments of the subject matter described in this specification can be implemented to realize one or more of the following advantages. Customizing a device based on historical data or user preference increases an efficiency of bandwidth utilization at a particular geographical position and time, because historical data can identify efficient uses in the past and user preference can identify a user's current knowledge of efficient uses. Therefore, a device can automatically and seamlessly switch among operational modes (e.g., modes that specify communication mediums or devices) to maximize data transfer speeds.

In addition, customizing a device based on user preferences can regulate an amount of bandwidth used by the user's communication devices (e.g., cable modem, wireless router) to further increase efficiency of bandwidth usage, transfer speeds, and even cost savings by meeting bandwidth quotas (e.g., data limits for internet connections, time limits for cellular networks) or using more cost effective communication means when they are available at a particular geographical position and time. Furthermore, the systems and techniques used to customize a device based on space and time can also be used to locate other devices that are capable of wireless transmissions, thereby increasing a utility of the device (e.g., for locating a Bluetooth™ enabled automobile or laptop computer).

DESCRIPTION OF DRAWINGS

Like reference numbers and designations in the various drawings indicate like elements.

DETAILED DESCRIPTION

Example Mobile Device

Figure 1:
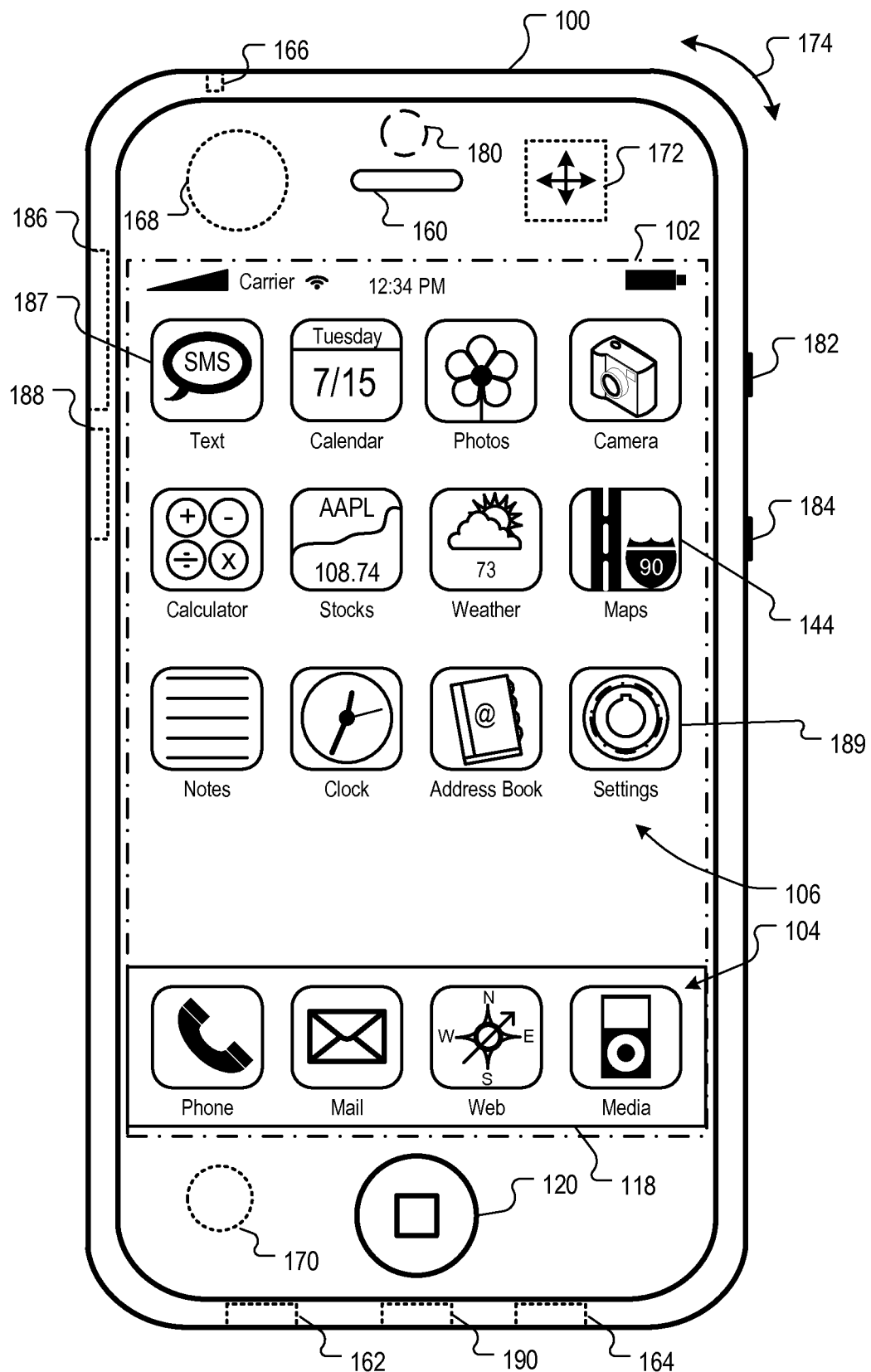
FIG. 1 illustrates an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch sensitive display 102 can be sensitive to haptic and/or tactile contact with a user. In addition, the mobile device 100 can include a touch-sensitive surface (e.g., a trackpad, or touchpad).

In some implementations, the touch-sensitive display 102 can include a multi-touch-sensitive display 102. A multi-touch-sensitive display 102 can, for example, process multiple simultaneous touch points, including processing data related to the pressure, degree, and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and 6,888,536, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104 and 106. In the example shown, the display objects 104 and 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, an e-mail device, a network data communication device, a Wi-Fi base station device (not shown), and a media processing device. In some implementations, particular display objects 104 can be displayed in a menu bar 118. In some implementations, device functionalities can be accessed from a top-level graphical user interface, such as the graphical user interface illustrated in FIG. 1. Touching one of the display objects 104 can, for example, invoke corresponding functionality. For example, touching the display object 189 would invoke a preferences application on the mobile device 100 for specifying user preferences of communication modes for a geographic position, as described with reference to FIG. 6. As another example, touching the display object 144 would invoke a maps application on the mobile device 100 for displaying a target position (e.g., a location of a user's automobile) on a map, as described with reference to FIG. 7.

In some implementations, the mobile device 100 can implement network distribution functionality. For example, the functionality can enable the user to take the mobile device 100 and provide access to its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching a phone object, the graphical user interface of the touch-sensitive display 102 may present display objects related to various phone functions; likewise, touching of an email object may cause the graphical user interface to present display objects related to various e-mail functions; touching a Web object may cause the graphical user interface to present display objects related to various Web-surfing functions; and touching a media player object may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the top-level graphical user interface environment of FIG. 1 can be restored by pressing the "home" display object.

In some implementations, the top-level graphical user interface can include additional display objects 106, such as a short messaging service (SMS) object 187, a calendar object, a photos object, a camera object, a calculator object, a stocks object, a weather object, a maps object 144, a notes object, a clock object, an address book object, and a settings object. Touching the maps object 144 can, for example, invoke a mapping and location-based services environment and supporting functionality; likewise, a selection of any of the display objects 106 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, an up/down button 184 for volume control of the speaker 160 and the microphone 162 can be included. The mobile device 100 can also include an on/off button 182 for a ring indicator of incoming phone calls. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a position determining capability, such as that provided by the Global Positioning System (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, a display screen, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

Network Operating Environment

Figure 2:
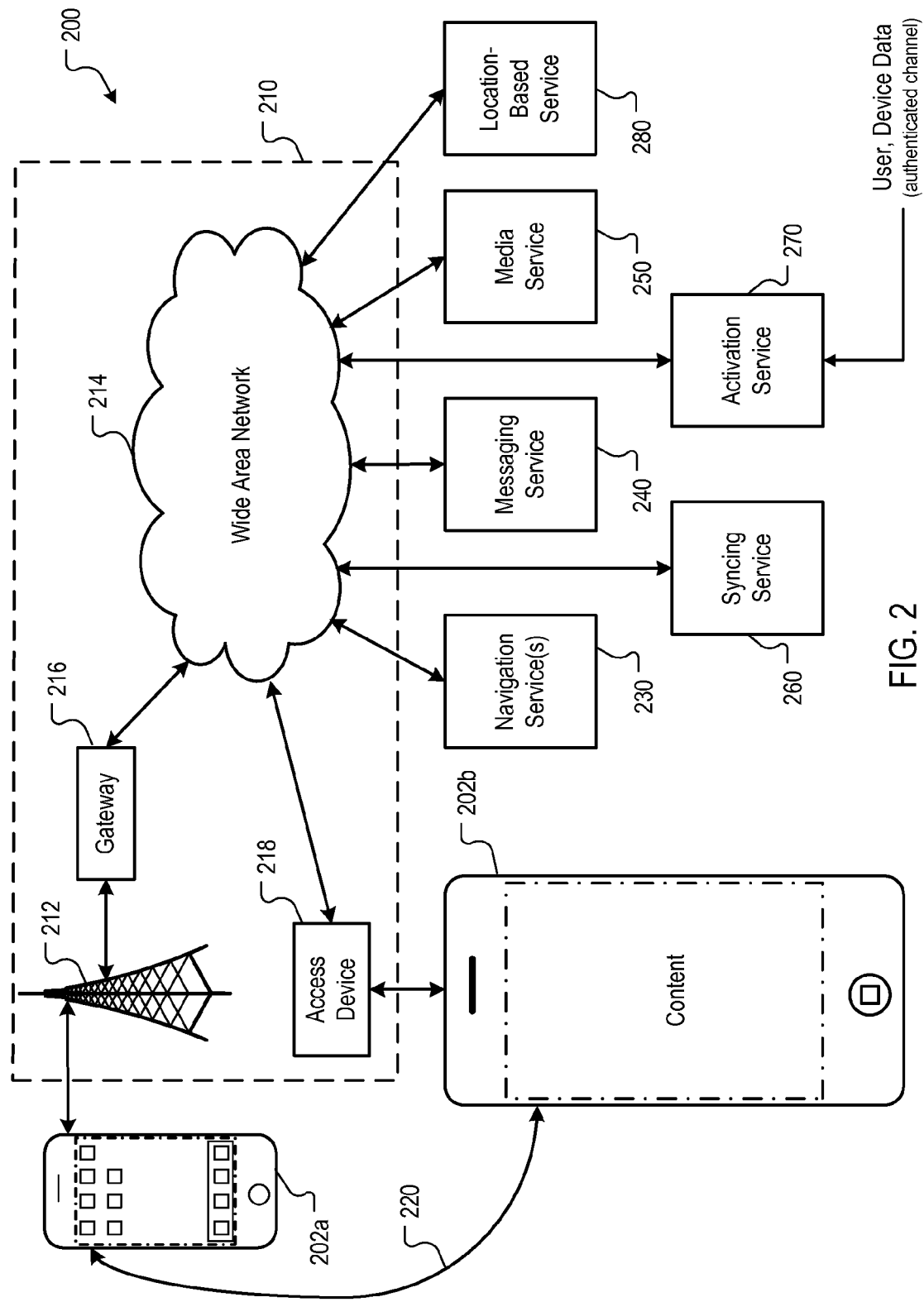
FIG. 2 is a block diagram of an example network operating environment for the mobile device of FIG. 1.

FIG. 2 is a block diagram of an example network operating environment 200 for the mobile device of FIG. 1. Mobile devices 202a and 202b can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access device 218, such as an 802.11g wireless access device, can provide communication access to the wide area network 214. In some implementations, both voice and data communications can be established over the wireless network 212 and the access device 218. For example, the mobile device 202a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, in some implementations, the mobile device 202b can place and receive phone calls, send and receive e-mail messages, and retrieve electronic documents over the access device 218 and the wide area network 214. In some implementations, the mobile device 202a or 202b can be physically connected to the access device 218 using one or more cables and the access device 218 can be a personal computer. In this configuration, the mobile device 202a or 202b can be referred to as a "tethered" device.

The mobile devices 202a and 202b can also establish communications by other means. For example, the wireless device 202a can communicate with other wireless devices, e.g., other mobile devices 202a or 202b, cell phones, etc., over the wireless network 212. Likewise, the mobile devices 202a and 202b can establish peer-to-peer communications 220, e.g., a personal area network, by use of one or more communication subsystems, such as the Bluetooth™ communication devices 188 shown in FIG. 1. Other communication protocols and topologies can also be implemented.

The mobile device 202a or 202b can, for example, communicate with one or more services 230, 240, 250, 260, 270, and 280 over the one or more wired and/or wireless networks 210. For example, one or more navigation services 230 can provide navigation information, e.g., map information, position information, route information, and other information, to the mobile device 202a or 202b. A user of the mobile device 202b can invoke a map functionality, e.g., by pressing the maps object 144 on the top-level graphical user interface shown in FIG. 1, and can request and receive a map for a particular location, request and receive route directions, or request and receive listings of businesses in the vicinity of a particular location, for example.

A messaging service 240 can, for example, provide e-mail and/or other messaging services. A media service 250 can, for example, provide access to media files, such as song files, audio books, movie files, video clips, and other media data. In some implementations, separate audio and video services (not shown) can provide access to the respective types of media files. A syncing service 260 can, for example, perform syncing services (e.g., sync files). An activation service 270 can, for example, perform an activation process for activating the mobile device 202a or 202b. A location-based service 280 (LBS) can, for example, provide content or services to the mobile device 202a or 202b based on their respective geographic locations. Other services can also be provided, including a software update service that automatically determines whether software updates exist for software on the mobile device 202a or 202b, then downloads the software updates to the mobile device 202a or 202b where the software updates can be manually or automatically unpacked and/or installed.

The mobile device 202a or 202b can also access other data and content over the one or more wired and/or wireless networks 210. For example, content publishers, such as news sites, RSS feeds, web sites, blogs, social networking sites, developer networks, etc., can be accessed by the mobile device 202a or 202b. Such access can be provided by invocation of a web browsing function or application (e.g., a browser) in response to a user touching, for example, a Web object.

Example Mobile Device Architecture

Figure 3:
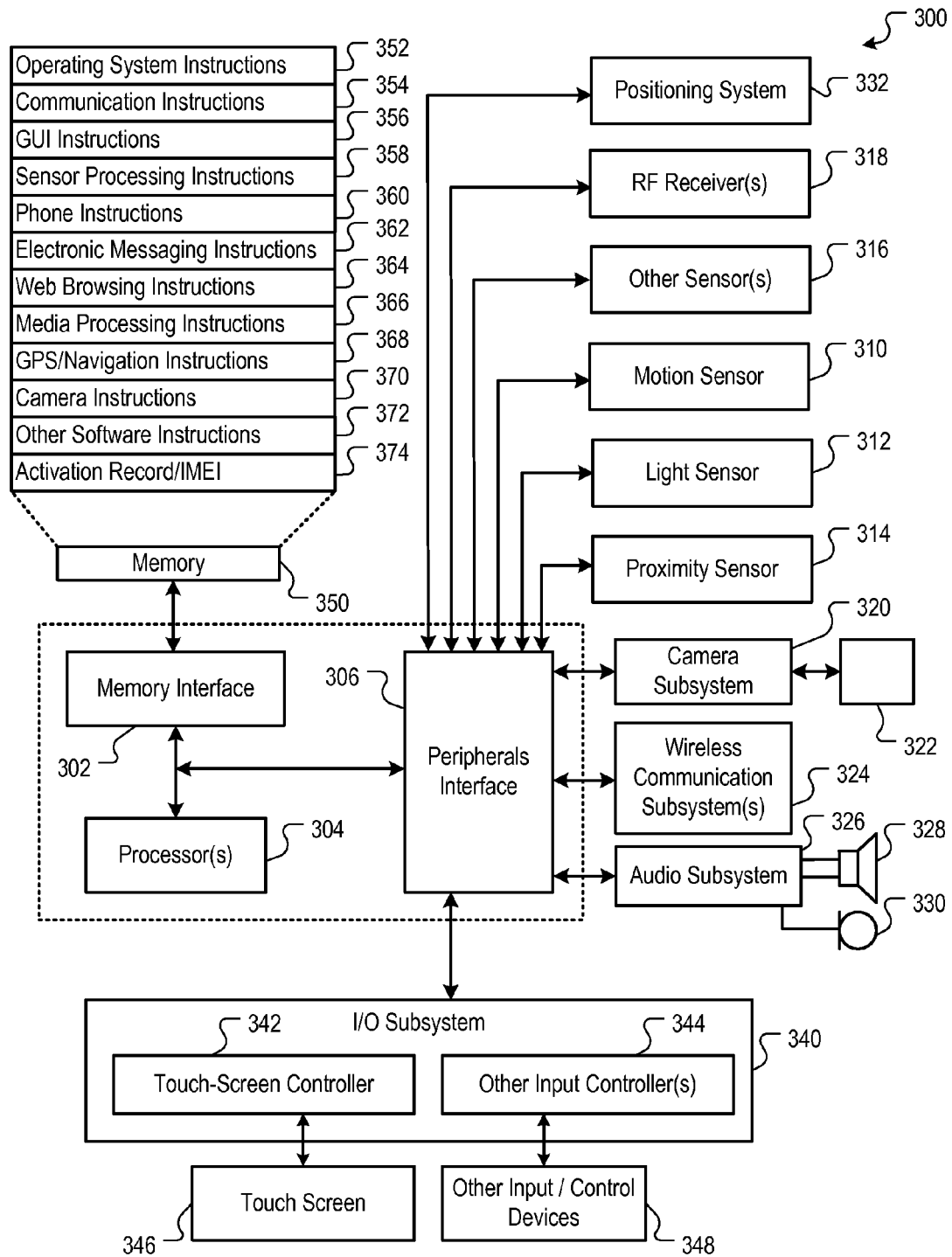
FIG. 3 is a block diagram of an example architecture for the mobile device of FIG. 1.

FIG. 3 is a block diagram of an example architecture 300 for the mobile device of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices, and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting, and proximity functions described with respect to FIG. 1. Other sensors 316 can also be connected to the peripherals interface 306, such as a temperature sensor, a biometric sensor, or other sensing device, to facilitate related functionalities.

For example, the mobile device 100 can receive positioning information from a positioning system 332. The positioning system 332, in various implementations, can be a component internal to the mobile device 100, or can be an external component coupled to the mobile device 100 (e.g., using a wired connection or a wireless connection). In some implementations, the positioning system 332 can include a GPS receiver and a positioning engine operable to derive positioning information from received GPS satellite signals. In other implementations, the positioning system 332 can include a compass (e.g., a magnetic compass) and an accelerometer, as well as a positioning engine operable to derive positioning information based on dead reckoning techniques. In still further implementations, the positioning system 332 can use wireless signals (e.g., cellular signals, IEEE 802.11 signals)

to determine position information associated with the mobile device, such as those provided by SKYHOOK WIRELESS of Boston, Mass. Hybrid positioning systems using a combination of satellite and television signals, such as those provided by ROSUM CORPORATION of Mountain View, Calif., can also be used. Other positioning systems are possible.

Broadcast reception functions can be facilitated through one or more radio frequency (RF) receiver(s) 318. An RF receiver can receive, for example, AM/FM broadcasts or satellite broadcasts (e.g., XM® or Sirius® radio broadcast). An RF receiver can also be a TV tuner. In some implementations, an RF receiver 318 is built into the wireless communication subsystems 324. In other implementations, an RF receiver 318 is an independent subsystem coupled to the mobile device 100 (e.g., using a wired connection or a wireless connection). The RF receiver 318 can receive simulcasts. In some implementations, the RF receiver 318 can include a Radio Data System (RDS) processor, which can process broadcast content and simulcast data (e.g., RDS data). In some implementations, the RF receiver 318 can be digitally tuned to receive broadcasts at various frequencies. In addition, the RF receiver 318 can include a scanning function which tunes up or down and pauses at a next frequency where broadcast content is available.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) or medium(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with the touch screen 346. In some implementations, the I/O subsystem 340 can be coupled to wired communication subsystems, e.g., through a docking station.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPhone™. The mobile device 100 may, therefore, include a 30-pin connector that is compatible with the iPhone™. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The communication instructions 354 can also be used to select an operational mode or communication medium for use by the device, based on a geographic position (obtained by the GPS/Navigation instructions 368) of the device. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions, e.g., mapping a target position; camera instructions 370 to facilitate camera-related processes and functions; and/or other software instructions 372 to facilitate other processes and functions, e.g., security processes and functions, and device customization processes and functions (based on predetermined user preferences). The memory 350 may also store other software instructions (not shown), such as web video instructions to facilitate web video-related processes and functions; and/or web shopping instructions to facilitate web shopping-related processes and functions. In some implementations, the media processing instructions 366 are divided into audio processing instructions and video processing instructions to facilitate audio processing-related processes and functions and video processing-related processes and functions, respectively. An activation record and International Mobile Equipment Identity (IMEI) 374 or similar hardware identifier can also be stored in memory 350.

Each of the above identified instructions and applications can correspond to a set of instructions for performing one or more functions described above. These instructions need not be implemented as separate software programs, procedures, or modules. The memory 350 can include additional instructions or fewer instructions. Furthermore, various functions of the mobile device 100 may be implemented in hardware and/or in software, including in one or more signal processing and/or application specific integrated circuits.

Example Positioning System

Figure 4:
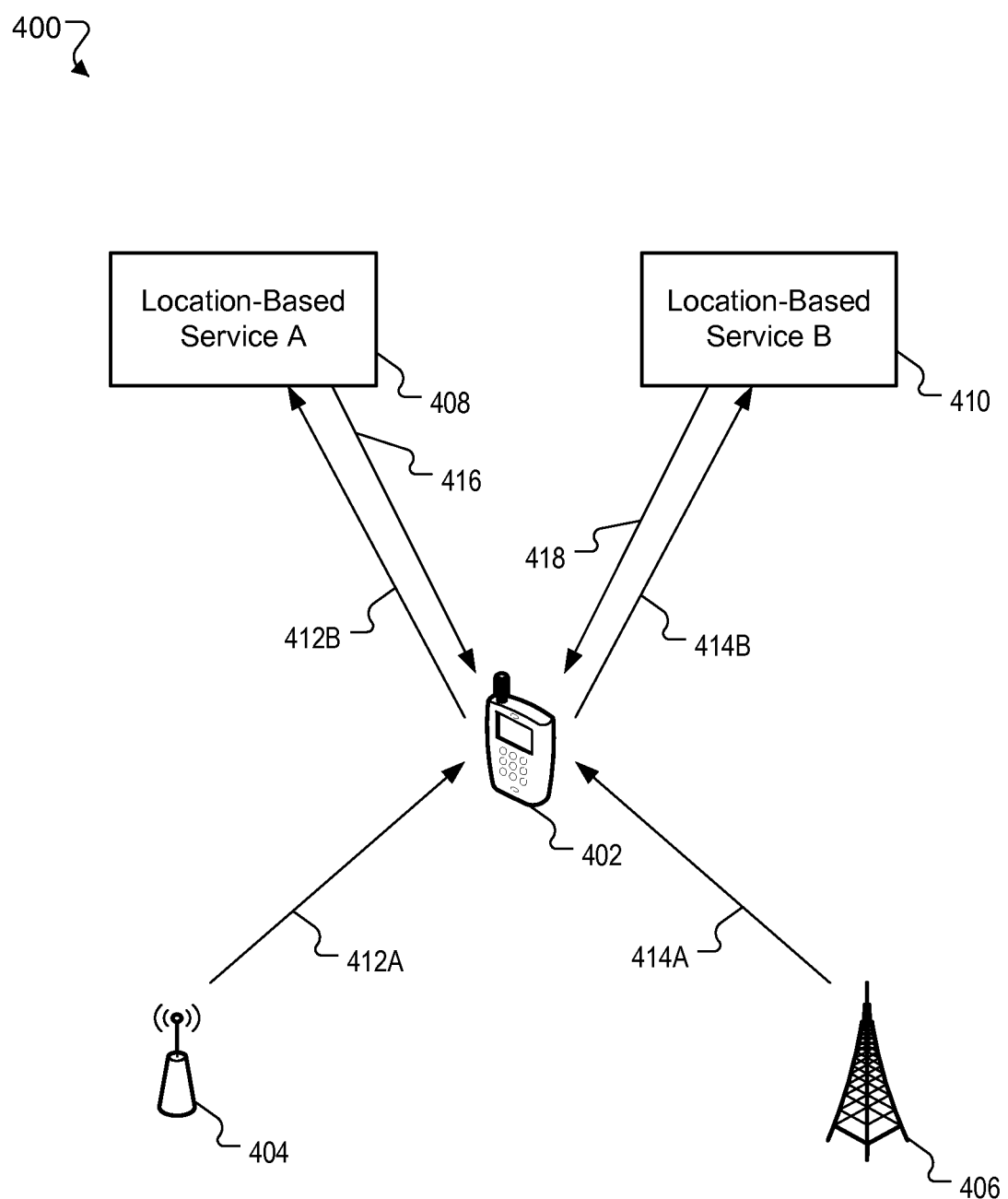
FIG. 4 illustrates an example positioning system which can be used with the mobile device of FIG. 1.

FIG. 4 illustrates an example positioning system 400 which can be used with the mobile device of FIG. 1. In FIG. 4, mobile device 402 can represent mobile device 100. The mobile device 402 can, for example, communicate to one or more network access points 404 (e.g., Wi-Fi base station devices) or one or more cell towers 406. In some implementations, the access points 404 can be any combination of 802.11b/g wireless routers, 802.11n wireless routers, and some other Wi-Fi devices that implement any suitable Wi-Fi or other wireless networking technology or protocol (e.g., GPS protocol). Using the communication with the access points 404 or the cell towers 406, a location-based service 408 (Location-Based Service A) or a location-based service 410 (Location-Based Service B) can estimate geographic areas where the mobile device 402 is currently located. The actual position of the mobile device 402 can be anywhere within the estimated geographic area. An estimated geographic area is not necessarily circular but can be indicated as a circular area on a map display for convenience.

The mobile device 402 can, for example, receive a communication 412A from an access point 404 (e.g., a Wi-Fi access point). The communication 412A can include information about the access point 404, e.g., the Internet Protocol (IP) address and/or the Media Access Control (MAC) address of the access point 404. The communication 412A can include other information, such as the latitude and longitude of the access point 404. The information received in communication 412A can be sent to the location-based service 408 in communication 412B. The location-based service 408 can, for example, with a degree of uncertainty or error, estimate a first geographic area in which the mobile device 402 is currently located using the information sent in communication 412B. In some implementations, the location-based service 408 is a system or service that estimates, with some degree of uncertainty or error, the position of a device using a database of access points mapped to geographic locations. The accuracy or precision (or the degree of uncertainty or error) of the estimated position can, for example, be based on the range of the technology, the accuracy of the range, or some other metric. Accuracy or precision of an estimated position can be affected by one or more factors including, for example, inherent properties or limitations of the technology or system, and a level of deployment of the given technology or system (e.g., number of access points or cell towers in the vicinity of the device).

In some implementations, the accuracy or precision of the estimated position is stated in units of distance (e.g., "the estimated position is accurate up to 50 meters"). That is, the actual position of the mobile device 402 can be within the accuracy distance from the estimated position. For example, the first geographic area can be a circle centered at the latitude and longitude of the estimated position with a radius equal to the stated accuracy or precision (e.g. 38 meters if the accuracy of the estimated position is up to 38 meters). The first geographic area can alternatively be represented on a map display as a square, rectangle, oval, diamond, triangle, or some other shaped enclosed region.

In some other implementations, unique signatures of multiple access points (e.g. five or more) can be compared to a local cache on the mobile device 402 or a central reference database at location-based service 408 via network communication (e.g. communication 412B can be sent to the location-based service 408). The location-based service 408 can use the unique signatures to estimate the latitude and longitude of the center of the first geographic circle with an m meter radius (e.g., about 20 meters).

In some implementations, location-based service 408 includes positioning services and reference database information provided by SKYHOOK WIRELESS of Boston, Mass.

The mobile device 402 can receive a communication 414A from cell tower 406. The cell communication 414A can include, for example, information identifying the cell tower 406. In some implementations, the cell communication 414A can also include the latitude and longitude of the cell tower 406. The identifying information and/or the latitude and longitude of the cell tower 406 can be sent to the location-based service 410 in communication 414B. The location-based service 410 can estimate a position of the mobile device 402 using the information included in communication 414B and estimate an accuracy of the estimate position. Thus, for example, the location-based service 410 can estimate a second geographic area in which the mobile device 402 is currently located. In some implementations, the second geographic area is represented on a map as a circular region centered at the estimated position and with a radius equal to the accuracy of the estimated position. In some other implementations, the second geographic area can represented on a map by a square or rectangular shaped enclosed region, to name a few additional examples.

In some implementations, the position and the geographic area of the mobile device 402 can be estimated using a "cell of origin" positioning technology. In some other implementations, the second geographic area can be determined by cell tower triangulation.

The first and second geographic areas can be sent to the mobile device 402 by communications 416 and 418, respectively. The mobile device 402 can present, on the touch-sensitive display 102 for example, a map view including an indication of one of the geographic areas if that one is entirely contained within the other geographic area (including the case where the boundaries of the geographic areas touch but otherwise no part of the one of the geographic area is outside of the other geographic area). For example, a map view that includes an indication of the first geographic area can be presented if the first geographic area is completely contained within the second geographic area. The mobile device 402 can present a map view that includes an indication of the second geographic area if the first geographic area is not completely contained within the second geographic area. For example, if the technology, system, or service used to estimate the first geographic area has a greater level of accuracy or precision detail than the technology, system, or service used to estimate the second geographic area, and the first geographic area is determined to be more accurate or precise based on the first geographic area being entirely within the second geographic area, the mobile device 402 can use the first geographic area. The level of detail of the technology can, for example, be determined by a priority table stored in the mobile device 402.

In another example, the first geographic area can be estimated using the access point 404, and the second geographic area can be estimated using the cell tower 406. In this example, the access point 404 was moved from its original location and the latitude and longitude coordinates of the access point 404 as they are known to location-based service 408 are incorrect and the mobile device 402 is not actually located within the first geographic area. The cell tower 406 provided correct location-based data and the mobile device 402 is located within the second geographic area. In this situation, the first and second geographic areas do not overlap, so the mobile device 402 would display a map view indicating the second geographic area. The mobile device 402 can be used to determine the accuracy of the first and second geographic areas, or an external server or servers can be used.

The location-based service 408 and location-based service 410 can run on the same device or on separate devices. For example, the location-based services 408 and 410 can run on servers communicating with the mobile device 100 through a network (e.g., WAN 214). The servers can be separate servers or the same server. The location-based services 408 and 410 can alternatively run on the mobile device 402.

The mobile device 402 can, for example, connect to additional devices or services (not shown) for location-based services, instead of, or in addition to the access point 404 and the cell tower 406. Such devices or services could include a Bluetooth™ device, GPS, radio or TV towers, or cellular grids, to name a few examples. For example, the mobile device 402 can connect to peer devices with the Bluetooth™ communication device 188 (FIG. 1) and receive location-based information from other mobile devices and/or Bluetooth™ enabled devices. In some implementations, the mobile device 402 can determine or estimate its position and/or geographic area using other technologies (e.g., GPS). In some implementations, the geographic area determined or estimated using any of these other technologies can be used (e.g., displayed) in lieu of the geographic area estimated using location-based services 408 or 410 (e.g., Wi-Fi or cellular positioning techniques) if the geographic area determined or estimated using the other technologies is contained entirely within the geographic area estimated using location-based services 408 or 410 and if the other technologies are more accurate or precise according to the priority table stored in the mobile device 402.

Example Device Customization Application

Figure 5:
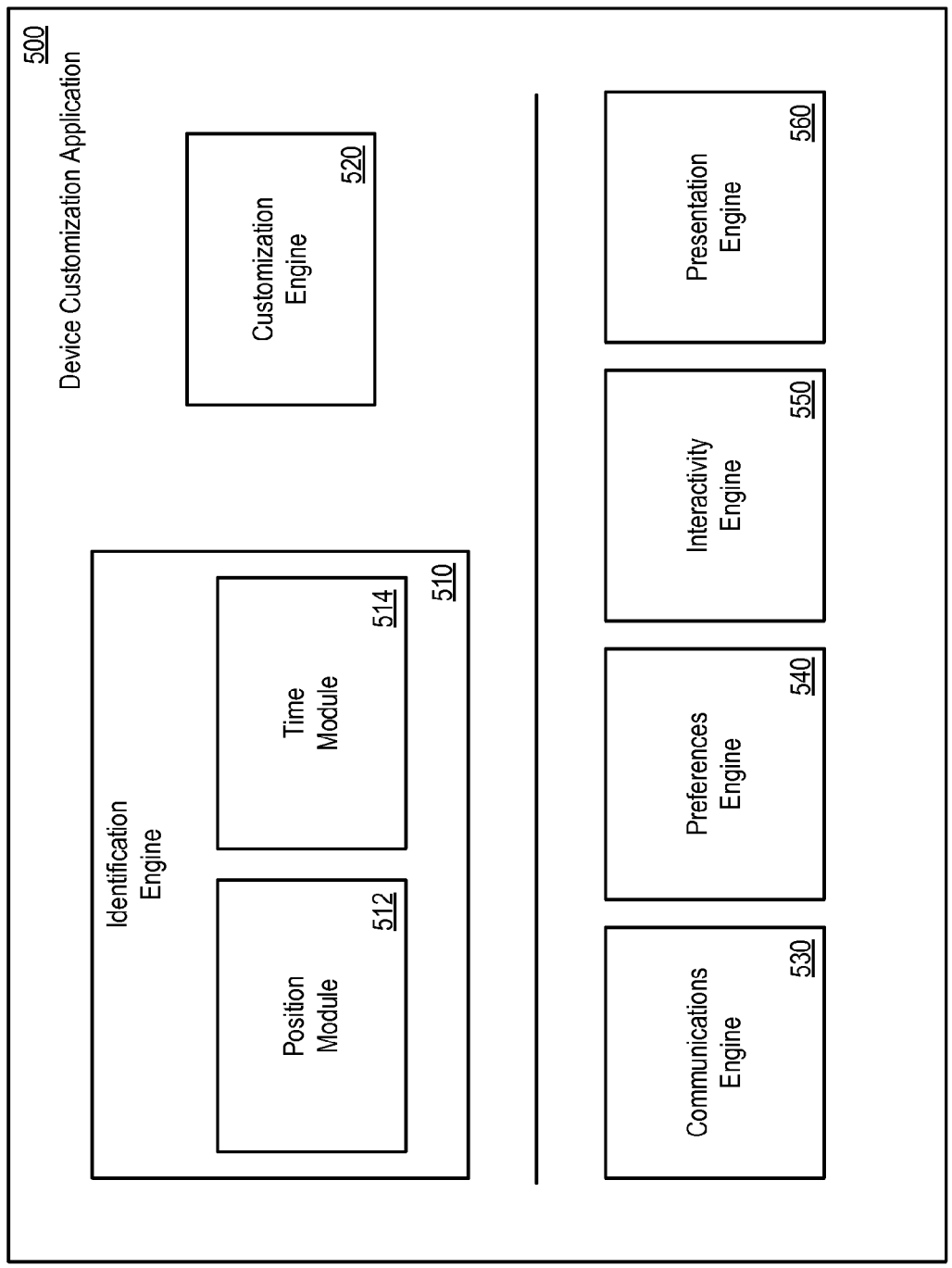
FIG. 5 is a block diagram of an example software application for customizing a device.

FIG. 5 is a block diagram of an example software application for customizing a device. The device customization application 500 includes an identification engine 510 for obtaining (e.g., identifying) geographical position data of a device and temporal data, a customization engine 520 for selecting a mode (e.g., an operational mode, a communication mode), a communications engine 530 for activating (e.g., connecting) the device to a communication device or medium, a preferences engine 540 for setting preferences associated with, for example, selection of operational modes or communication modes, an interactivity engine 550 for processing interactions between a user and the device, and a presentation engine 560 for presenting system objects, for example, to a user.

Engines 510, 520, 530, 540, 550, and 560 can be communicatively coupled to one or more of each other. Though the engines identified above are described as being separate or distinct, one or more of the engines may be combined in a single process or routine. The functional description provided herein including separation of responsibility for distinct functions is by way of example. Other groupings or other divisions of functional responsibilities can be made as necessary or in accordance with design preferences.

Identification engine 510 can include a position module 512 and a time module 514. Position module 512 can obtain geographic position data of a device. The geographic position data can identify a geographic position of a device (e.g., a mobile device such as a mobile phone). Position module 512 can process the geographic position data to identify the geographic position. For example, position module 512 can use the systems and techniques described with reference to FIG. 4 to determine or estimate a geographic location or area of the device. In some implementations, the position module 512 can process the geographic position data to also identify a heading or direction of the device. In particular, position module 512 can communicate with services, devices, and technologies, internal and external to the device such as a Bluetooth™ device, GPS, radio or TV towers, or cellular grids for location-based services to obtain the geographic position data.

Time module 514 can obtain temporal data. Temporal data can include a history of the device's operation, e.g., operational modes selected for activation on the device. In particular, each operational mode in the history can identify a communication medium used by the device at the geographic position.

In some implementations, the history can be specified for a particular time period (e.g., of a day, or over multiple days). For example, each operational mode selected for activation on the device can be associated with a timestamp. The timestamp can identify a particular time of day for which the operational mode was selected for activation on the device. The history can include the operational modes that were selected for activation on the device that are associated with timestamps that are within the particular time period of a day. Selecting from a history of operational modes previously selected for activation for the particular time period of the day that corresponds to a current time can increase the likelihood of a successful or effective connection (e.g., a fast connection).

In some implementations, the history can be further defined by operational modes that are associated with a connection success confidence value greater than a threshold value. The connection success confidence value can be defined, for example, by a ratio of successful connections to connection attempts, thereby representing a likelihood of the connection to be successful. In another example, the connection success confidence value can be defined by one or more signal strength values associated with the geographical position. In particular, a signal strength value can be an average signal strength calculated by the wireless communication subsystem(s) 324 and the other sensor(s) 316, for example, over a predetermined period of time, e.g., in a predetermined number of hours, weeks, or months preceding the current connection attempt.

Other implementations are possible. For example, the connection success confidence value can be defined by a ratio of successful connections to connection attempts by all devices using the particular communication medium or device. As another example, the signal strength value can be an average signal strength of all devices using the particular communication medium or device, or all the same model of devices (e.g., same hardware model using the same firmware version) using the particular communication medium or device.

In some implementations, selection of an operational mode can be based on both the position of the device and a signal strength value. For example, if the signal strength value for two modes are substantially similar (e.g., the signal strength of communication mediums associated with the two modes are within +/−2 dB of each other) at a particular location, the mode associated with the location where the device is headed can be selected. As another example, if signal strength values for both modes are above a threshold value at a particular location, the mode associated with the location where the device is headed can be selected.

In some implementations, the temporal data can identify a time of day (e.g., 4:30 PM PDT) at the geographic position. In a similar manner as described above, operational modes can be selected based on the time of day at the geographic position.

The geographic position data of the device, along with the temporal data in some implementations, can be used by customization engine 520 to select an operational mode of the device, as described in more detail below. In some implementations, the operational mode can identify a communication medium or a communication device. For example, based on the geographical position of the device and a time of day, customization engine 520 can select an operational mode that uses Wi-Fi or a 3G cellular network. In particular, if the user is at home during peak hours of 3G data usage as identified by position module 512 and time module 514 of the identification engine 510, then customization engine 520 can select an operational mode that corresponds to using a Wi-Fi network and communications engine 530 can send this selection to the wireless communications subsystem(s) 324.

Other implementations are possible. For example, customization engine 520 can select a communication device such as an access point. As another example, customization engine 520 can be used to modify other aspects of the device's operation, e.g., interface customizations (e.g., graphical and audio customizations), software applications, push updates, media (e.g., audio, video, text), power management, security settings, and other device settings and configurations.

As described above, communications engine 530 can connect the device to another communication device or medium based on, for example, an operation mode selected by customization engine 520.

In addition, communications engine 530 can obtain a signal strength of a signal transmitted or received on the communication medium. For example, a signal strength value can calculated by the wireless communication subsystem(s) 324 and the other sensor(s) 316, and communications engine 530 can obtain the signal strength value from the wireless communication subsystem(s) 324 and the other sensor(s) 316. As another example, the wireless communication subsystem(s) 324 and the other sensor(s) 316 can generate signal strength data and communications engine 530 can identify a signal strength value from the signal strength data. Other implementations are possible. For example, communications engine 530 can detect the signal strength of a signal and calculate the signal strength value.

Communications engine 530 can monitor signal strength values of signals transmitted or received at the device. When the signal strength is first identified (e.g., detected) as less than a threshold signal strength value, a geographic position of the device (e.g., the current geographic position of the device) can be stored as a target position. Storing the target position can be advantageous for locating mobile objects that can transmit or receive, for example, wireless signals.

For example, some automobiles are equipped with a Bluetooth™ communication device. In general, Bluetooth™ communication devices have transmission ranges from about 10 to 100 meters. Therefore, if the threshold signal strength value is set to zero (e.g., no detected signal), the stored target position can help a user identify a position within 10 to 100 meters of the automobile. The threshold signal strength value can be set higher (e.g., requiring a greater signal strength) to increase the precision and accuracy of the identified location of the automobile.

Other implementations are possible. For example, the systems and techniques can be used in a similar manner to locate other mobile devices capable of transmitting wireless signals, such as but not limited to laptop computers. As another example, a geographical position can be stored as a target position when the customization engine 520 switches to a different operational mode (e.g., a different communication medium or device).

Preferences engine 540 can be used to query a user for preferences for use with selecting operational modes or communication modes, based on the geographic position of a device. Preferences engine 540 also may be used to set preferences to default values, to modify preferences that have already been set, and to present the preference selections to a user. Preferences may relate to, for example, specifying particular operational modes or communication modes for particular geographic positions or times of day, prioritizing operational modes or communications modes for particular geographic positions or times of day, setting connection success confidence values, setting signal strength threshold values, a memory setting for any of the aforementioned preferences, and other preferences that provide for modification of how device customization application 500 selects an operational mode or communication mode. For example, a user can specify an editable list of one or more communication mediums (e.g., Wi-Fi networks) for a geographic position. As another example, a user can specify an editable list of one or more communication devices (e.g., access points) for a geographic position.

Other implementations are possible. In some implementations, particular protocols or operational modes can be selected for use on the device based on other context. For example, different operational modes can be selected based on the geographic position data and a type of wired subsystem that the device is connected to. As a particular example, if a mobile device is connected to a wired communication subsystem (e.g., through a docking station) at a user's office, an operational mode that does not use encryption can be selected. In addition, if the mobile device is connected to a wired communication subsystem at the user's home, an operational mode that uses encryption can be selected. In these and other implementations, the additional context and effect the additional context has on the selection of an operational mode can be predetermined, e.g., by user preferences.

Interactivity engine 550 can process interactions between a user and the device, for example, by storing information describing the various types of input provided by the user at the device. Interactivity engine 550 can use such stored information to determine what action is desired in response to a user's interaction with the device, and to perform the desired action. For example, interactivity engine 550 can receive input specifying preferences to be processed by preferences engine 540. As another example, interactivity engine 550 can be used to hide and display an interface element (e.g., window) for providing preferences. As another example, interactivity engine 550 can receive input (e.g., a gesture) specifying navigation of a map that displays a target position (e.g., a location of an automobile).

Presentation engine 560 can interact with GUI instructions 356, for example, to present the interface element for providing preferences. In addition, presentation engine 560 can also interact with other software components external to device customization application 500 (e.g., a mapping application in other software instructions 372) to present, for example, geographic positions and target positions in a map.

Example Interfaces

Figure 6:
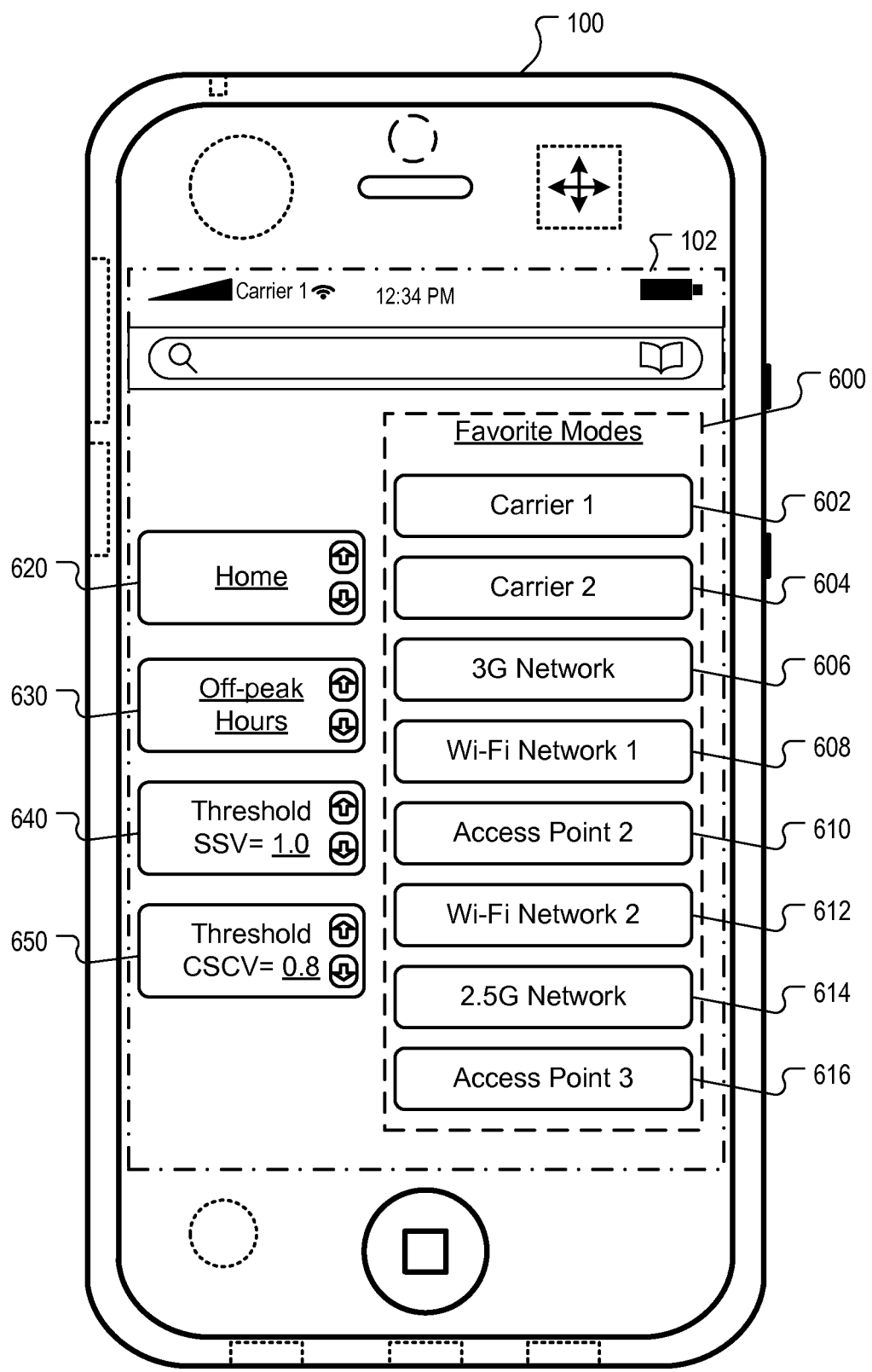
FIG. 6 illustrates an example user interface for specifying preferences.

FIG. 6 illustrates an example user interface for specifying preferences. The touch sensitive display 102 of mobile device 100 shows an example of a user editable list 600 that provides preferences that the user can specify or edit. In particular, the user editable list 600 is a favorites list of "Favorite Modes". In the example, communication modes are specified by different types of communication mediums 602, 604, 606, 608, 612, and 614 and different types of communication devices 610 and 616.

In some implementations, the user editable list 600 can display the preferences in order of priority, and the user can also specify the priority. For example, the user can use gestures on the touch sensitive display 102 to drag and drop the communication modes in order of priority from top to bottom. Other implementations are possible.

The user interface for specifying preferences includes other interface elements 620, 630, 640, and 650 for specifying a geographic position, a time, a threshold signal strength value ("Threshold SSV"), and a threshold for a connection success confidence value ("Threshold CSCV"), respectively. In the example, the user editable list 600 is related to the particular geographic location "Home" (as specified by interface element 620) and time "Off-peak Hours" (as specified by interface element 630). Other user editable lists that are related to other combinations of geographic locations and times can also be stored in memory. In addition, other implementations are possible. For example, the time in interface element 630 can be specified using a particular range of times in a day (e.g., 9:00 PM to 11:00 PM) or a range of days (e.g., Monday to Friday).

Figure 7:
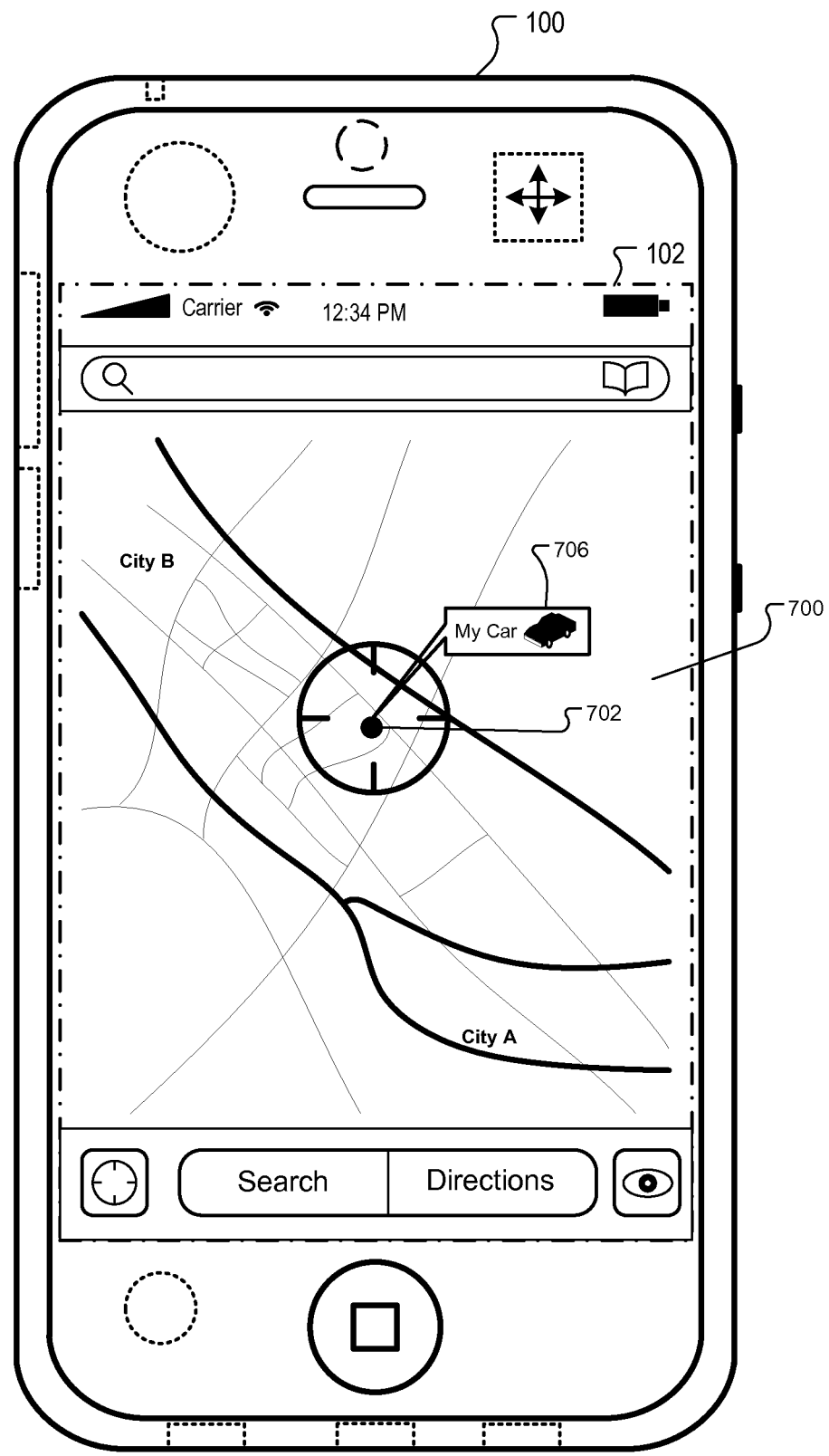
FIG. 7 illustrates an example map display showing a target position.

FIG. 7 illustrates an example map display 700 showing a target position. In particular, the touch sensitive display 102 of mobile device 100 shows a map display 700 of a maps application. The map display 700 shows a placemark 702 at a target position (e.g., a location of a user's car) identified by the device customization application 500, as described with reference to the communications engine 530. In some implementations, the user can touch the placemark 702 and a graphical object 706 (e.g., balloon, bubble, window, pane) appears showing the address or other information for the target position represented by the placemark 702.

Example Processes for Device Customization

Based on Space & Time

Figure 8:
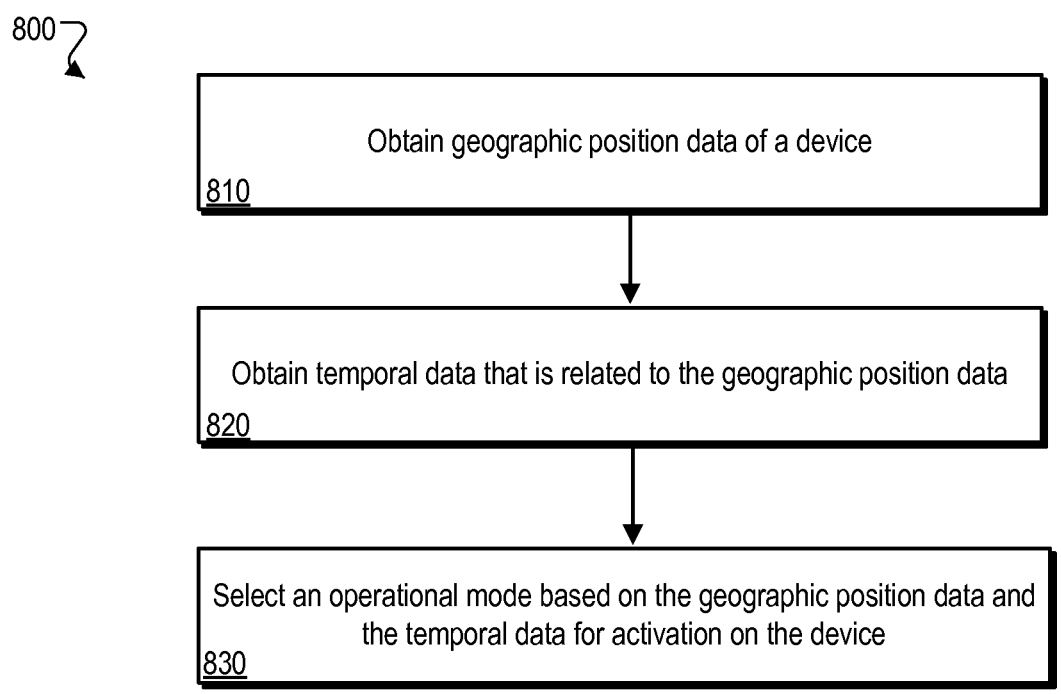
FIG. 8 is a flow diagram of an example process for customizing a device.

FIG. 8 is a flow diagram of an example process 800 for customizing a device. The process 800 includes obtaining 810 geographic position data of a device. For example, position module 512 of identification engine 510 can obtain geographic position data of a device, e.g., that identifies a geographic position of the device. The process 800 also includes obtaining 820 temporal data that is related to the geographic position data. For example, time module 514 of identification engine 510 can obtain temporal data that is related to the geographic position data, e.g., a time of day at the geographic position. Process 800 also includes selecting 830 an operational mode based on the geographic position data and the temporal data for activation on the device. For example, customization engine 520 can select an operation mode (e.g., a communication mode specifying a communication medium) based on the geographic position data and the temporal data for activation on the device.

Based on User Preference

Figure 9:
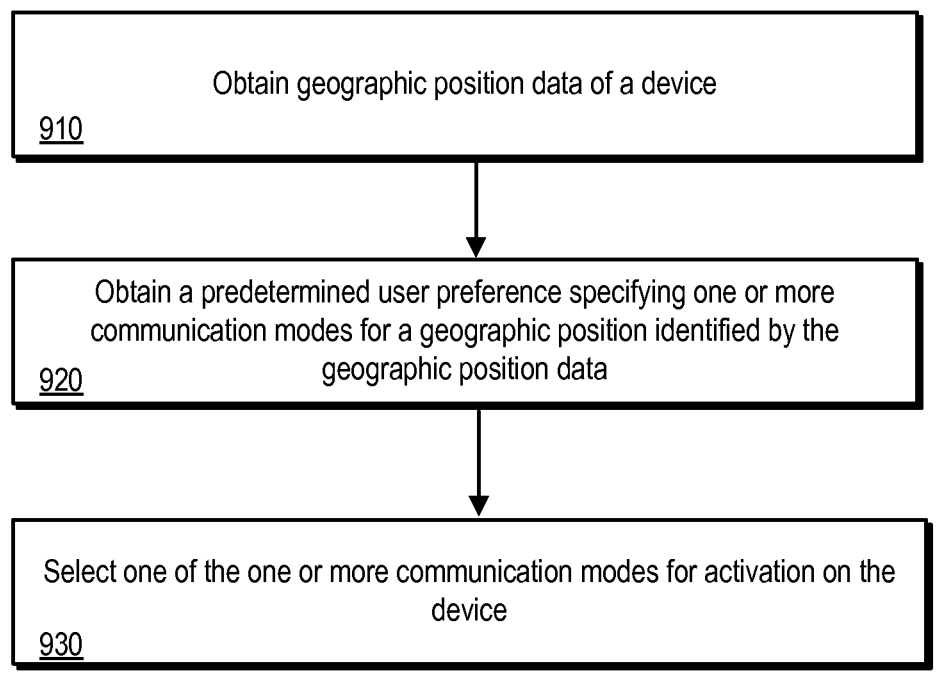
FIG. 9 is a flow diagram of another example process for customizing a device.

FIG. 9 is a flow diagram of another example process 900 for customizing a device. The process 900 includes obtaining 910 geographic position data of a device. For example, position module 512 of identification engine 510 can obtain geographic position data of a device, e.g., that identifies a geographic position of the device. The process 900 also includes obtaining 920 a predetermined user preference specifying one or more communication modes for a geographic position identified by the geographic position data. For example, preferences engine 540 can obtain the predetermined user preference. The process 900 also includes selecting 930 one of the one or more communication modes for activation on the device. For example, the customization engine 520 can select one of the one or more communication modes for activation on the device.

For Showing a Target Position

Figure 10:
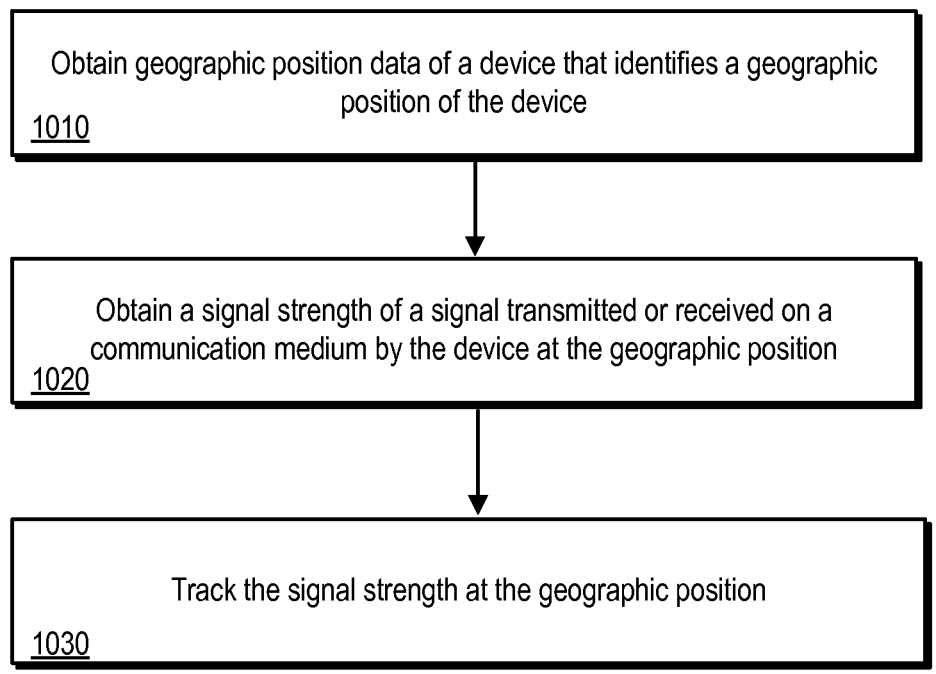
FIG. 10 is a flow diagram of an example process that can be used for tracking a target position.

FIG. 10 is a flow diagram of an example process 1000 that can be used for tracking a target position. The process 1000 includes obtaining 1010 geographic position data of a device that identifies a geographic position of the device. For example, position module 512 of identification engine 510 can obtain geographic position data of a device that identifies a geographic position of the device. The process 1000 also includes obtaining 1020 a signal strength of a signal transmitted or received on a communication medium by the device at the geographic position. For example, communications engine 530 can obtain the signal strength. The process also includes tracking 1030 the signal strength at the geographic position. For example, communications engine 530 can also track the signal strength. In some implementations, the tracking includes storing the geographic position as a target position when the signal strength is first identified as less than a threshold signal strength value, for display in the device. For example, the customization engine 520 can store the geographic position as a target position when it selects a new operational mode.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. For example, engines 510, 520, 530, 540, 550, and 560 need not perform all, or any, of the functionality attributed to that engine in the implementations described above, and all or part of the functionality attributed to one engine may be performed by another engine, another additional module, or not performed at all. Accordingly, other implementations are within the scope of the following claims.

What is claimed is:

1. A method comprising:
obtaining geographic position data of a device;
determining current geographic location of the device based on the obtained geographic position data;
obtaining temporal data that is related to the geographic position data, where the temporal data identifies a current time of day at the current geographic location of the device;
accessing a known group of operational modes associated with the device, the known group of operational modes including operational modes that were previously used by the device, where the known group of operational modes includes, for each geographic position, operational modes associated with different communication mediums used by the device at the geographic position;
identifying, from the known group of operational modes associated with the device, an operational mode that had been previously selected for activation on the device for a particular time period of the day corresponding to the identified current time of day and for the current geographic location; and selecting the identified operational mode for activation on the device at the current time of day and the current geographic location.

2. The method of claim 1, where the device is a mobile device, the method further comprising:
identifying a heading or direction of the mobile device;
determining a future geographic position of the device based on the identified heading or direction; and
identifying, from the known group of operational modes associated with the device, an operational mode that had been previously selected for activation on the device at the future geographic position of the device.

3. The method of claim 1, where the known group includes operational modes associated with a connection success confidence value greater than a threshold value, the connection success confidence value based on a ratio of successful connections to connection attempts.

4. The method of claim 1, where the known group includes operational modes associated with a connection success confidence value greater than a threshold value, the connection success confidence value based on one or more signal strength values associated with the geographical position.

5. The method of claim 1, where the temporal data includes the known group of operational modes associated with the device.

6. The method of claim 1, wherein the known group of operational modes includes a history of operational modes associated with the device.

7. A method comprising:
obtaining geographic position data of a device;
determining current geographic location of the device based on the obtained geographic position data;
examining a user editable list that includes one or more communication modes for the current geographic location, where the one or more communication modes are associated with different communication networks and are displayed in the user editable list in an order of priority that is associated with one of particular geographic positions, times of day, connection success confidence values, or signal strength threshold values; and
selecting, from the user editable list that includes one or more communication modes associated with different communication networks, a communication mode for activation on the device at the current geographic location.

8. The method of claim 7, where the order of priority is specified by a user.

9. A method comprising:
obtaining geographic position data of a device that identifies a first geographic position of the device;
obtaining a signal strength of a signal transmitted or received on a communication medium by the device at the first geographic position;
tracking the signal strength based on movement of the device relative to the first geographic position;
when the signal strength is first identified as less than a threshold signal strength value, storing the first geographic position of the device as a target position; and
displaying the target position on a display of the device using a map display showing a placemark corresponding to the target position, where the placemark includes a graphical icon.

10. A system comprising:
one or more processors; and
memory coupled to the one or more processors and storing instructions which, when executed by the one or more processors, cause the one or more processors to perform operations comprising:
obtaining geographic position data of a device;
determining current geographic location of the device based on the obtained geographic position data;
obtaining temporal data that is related to the geographic position data, where the temporal data identifies a current time of day at the current geographic location of the device;
accessing a known group of operational modes associated with the device, the known group of operational modes including operational modes that were previously used by the device, where the known group of operational modes includes, for each geographic position, operational modes associated with different communication mediums used by the device at the geographic position;
identifying, from the known group of operational modes associated with the device, an operational mode that had been previously selected for activation on the device for a particular time period of the day corresponding to the identified current time of day and for the current geographic location; and
selecting the identified operational mode for activation on the device at the current time of day and the current geographic location.

11. The system of claim 10, where the device is a mobile device and wherein the instructions cause the one or more processors to perform operations further comprising:
identifying a heading or direction of the mobile device;
determining a future geographic position of the device based on the identified heading or direction; and
identifying, from the known group of operational modes associated with the device, an operational mode that had been previously selected for activation on the device at the future geographic position of the device.

12. The system of claim 10, where the known group includes operational modes associated with a connection success confidence value greater than a threshold value, the connection success confidence value based on a ratio of successful connections to connection attempts.

13. The system of claim 10, where the known group includes operational modes associated with a connection success confidence value greater than a threshold value, the connection success confidence value based on one or more signal strength values associated with the geographical position.

14. The system of claim 10, where the temporal data includes the known group of operational modes associated with the device.

15. The system of claim 10, wherein the known group of operational modes includes a history of operational modes associated with the device.

16. A system comprising:
one or more processors; and
memory coupled to the one or more processors and storing instructions which, when executed by the one or more processors, cause the one or more processors to perform operations comprising:
obtaining geographic position data of a device;
determining current geographic location of the device based on the obtained geographic position data;
examining a user editable list that includes one or more communication modes for the current geographic location, where the one or more communication modes are associated with different communication networks and are displayed in the user editable list in an order of priority that is associated with one of particular geographic positions, times of day, connection success confidence values, or signal strength threshold values; and
selecting, from the user editable list that includes one or more communication modes associated with different communication networks, a communication mode for activation on the device at the current geographic location.

17. The system of claim 16, where the order of priority is specified by a user.

18. A system comprising:
one or more processors; and
memory coupled to the one or more processors and storing instructions which, when executed by the one or more processors, cause the one or more processors to perform operations comprising:
obtaining geographic position data of a device that identifies a first geographic position of the device;
obtaining a signal strength of a signal transmitted or received on a communication medium by the device at the first geographic position;
tracking the signal strength based on movement of the device relative to the first geographic position;
when the signal strength is first identified as less than a threshold signal strength value, storing the first geographic position of the device as a target position; and
displaying the target position on a display of the device using a map display showing a placemark corresponding to the target position, where the placemark includes a graphical icon.

* * * * *